Nov. 24, 1959     C. J. WERNER     2,914,140
HYDRAULIC WHEEL CYLINDER FOR MULTIPLE DISK
BRAKE WITH LEAKAGE BLEED-OFF
Filed Nov. 30, 1955
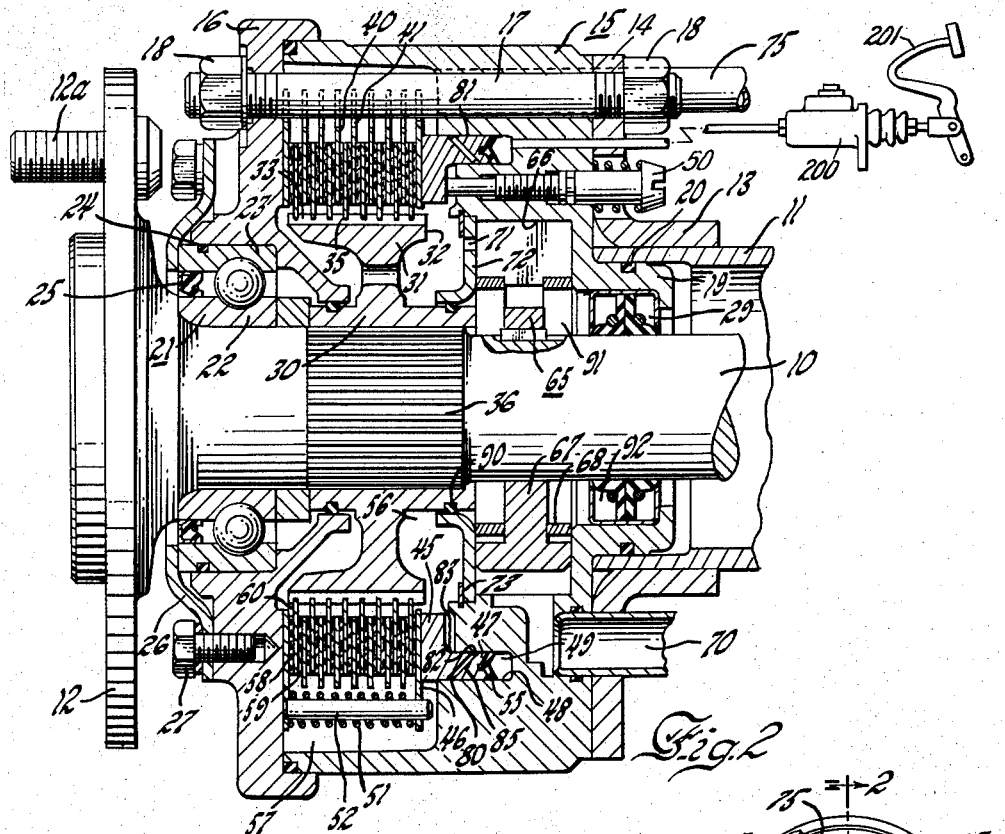
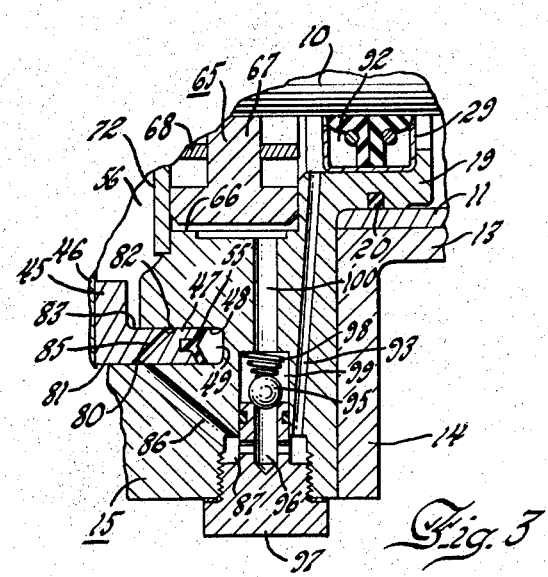
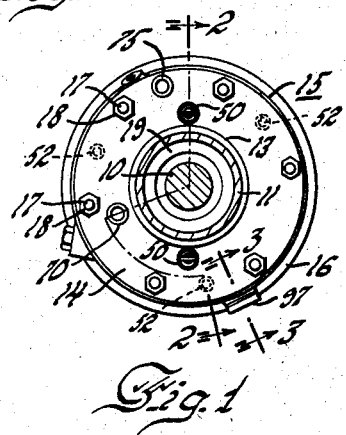
INVENTOR.
Calvin J. Werner
BY Craig V. Morton
HIS ATTORNEY

United States Patent Office 2,914,140
Patented Nov. 24, 1959

2,914,140

HYDRAULIC WHEEL CYLINDER FOR MULTIPLE DISK BRAKE WITH LEAKAGE BLEED-OFF

Calvin J. Werner, Dayton, Ohio, assignor to General Motors Corporation, Detroit, Mich., a corporation of Delaware Application November 30, 1955, Serial No. 549,953

6 Claims. (Cl. 188—72)

This invention relates to friction brakes having a plurality of engaging friction disks to effect brake action and adapted to have a fluid under pressure circulating between the disks to dissipate heat of friction of the disks while they are in engagement.

In the friction brake of this invention there is provided a plurality of friction disks within a closed housing with some of the disks carried on a rotating shaft that extends through the housing and others mounted stationary relative to the housing. The housing is adapted to receive fluid under pressure for circulation between the disks to dissipate heat of friction when the disks are in engagement. Actuation of the disks is occasioned by a hydraulically operated piston that reciprocates within a cylinder that is adapted to receive hydraulic fluid from a master cylinder that is operated manually by the brake pedal on a motor vehicle. The hydraulically operated piston extends into the interior of the housing and is thus exposed to the pressure fluid within the housing that circulates between the brake disks with the result that there is a tendency for pressure fluid to seep between the walls of the hydraulically operated piston and its cooperating cylinder and enter the cylinder chamber that is adapted to receive the hydraulic fluid from the master cylinder. Seepage of pressure fluid into the wheel cylinder chamber tends to overfill the hydraulic fluid system for actuating the piston to result in a tendency toward maintaining the brake disks in engaged position.

It is therefore an object of this invention to provide a means to intercept the seepage of fluid between the walls of the wheel cylinder and cooperating piston in a manner that the fluid can be directed to an area of low pressure and thereby be drawn off from between the piston and cylinder walls to prevent it from entering the wheel cylinder.

It is also an object of the invention to provide a friction brake incorporating the feature of the foregoing object wherein a control means is provided in the passage means that conducts seepage fluid away from the wheel cylinder and piston to effect a pressure differential in the passage and prevent an extremely low pressure being connected to the seepage bleed-off passage which would tend to draw pressure fluid from within the housing.

Further objects and advantages of the present invention will be apparent from the following description, reference being had to the accompanying drawings wherein a preferred form of the invention is clearly shown.

In the drawings:

Figure 1 is a small elevational view of a brake incorporating features of this invention.

Figure 2 is a cross sectional view taken along line 2—2 of Figure 1.

Figure 3 is an enlarged cross sectional view of a portion of the brake illustrating the seepage bleed-off arrangement of this invention.

The multiple disk brake of this invention is carried upon an axle 10 that extends through an axle housing 11 connected with a conventional differential housing. The axle 10 is provided with a wheel flange 12 having the wheel mounting studs 12a.

The axle housing 11 carries a mounting member 13 that is secured to the housing 11 and has a radial flange 14.

A brake housing 15 having a hollow interior is closed at the open end thereof by means of a cover member 16. The cover member 16 and the housing 15 are secured together with the housing 15 being supported upon the flange 14 of the support member 13 by means of studs 17 provided at each end with the retaining nuts 18.

The brake housing 15 has a cylindrical extension 19 that is slidably disposed within the interior periphery of the axle housing 11 with an O-ring seal member 20 between the members to prevent loss of grease from the axle housing. A seal 29 is provided between the shaft 10 and housing extension 19.

The cover member 16 supports an anti-friction bearing member 21 that has the inner race 22 supporting the axle 10 while the outer race 23 is supported within a recess in the cover plate 16 with an O-ring seal member 24 therebetween. A fluid and grease seal 25 is provided between the inner and outer races of the anti-friction bearing 21. A retaining plate 26 is secured to the cover plate 16 by means of the bolts 27 whereby to hold the anti-friction bearing member 21 within the cover plate 16.

The axle 10 supports a hub member 30 that has a radial spider structure 31 terminating in a cylindrical periphery 32 in which there is provided a series of axially disposed grooves 33 providing splines on which there is slidably mounted a plurality of brake disks 35 that rotate with the hub 30 that is non-rotatably carried with the axle 10 by means of the spline 36.

A series of brake disks 40 are carried between the rotatable disks 35. Each of the disks 40 is provided with a peripheral slot 41 through which the stud 17 extends but the disks 40 are retained stationary relative to the brake housing 15.

The brake disk assemblage consisting of the rotatable disks 35 and the stationary disks 40 are moved into frictional engagement with one another for a braking action by means of an actuating member 45 that is in the form of an annulus or disk. The actuating member 45 has one face thereof engaging a stationary wear disk 46 that in turn engages the brake disk assemblage 35, 40 by which the assemblage is brought into braking engagement.

The brake actuating member 45 has an axial extension 47 in the form of an annulus that is slidably disposed within an annular groove 48 provided in the brake housing 15 whereby the cooperation of the annulus 47 in the groove 48 forms an annular chamber 49 that is adapted to receive actuating brake fluid from a conventional master cylinder 200 that is operated by a brake pedal 201 on the motor vehicle. The annular extension 47 may be termed a wheel piston while the annular groove 48 may be termed a wheel cylinder in which the annular wheel piston 47 reciprocates. A seal member 55 prevents loss of brake fluid from the chamber 49. Brake fluid is transferred to and from the annular chamber 49 by operation of a master cylinder, not disclosed.

The actuating member 45 for the disk assemblage 35, 40 is normally retained in a retracted position against the adjusting stops 50 by means of the retraction springs 51 carried around guide studs 52.

The brake disk assemblage 35, 40 together with the actuating member 45 for the assemblage divides the hollow interior of the brake housing 15 into an internal chamber 56 and an external chamber 57.

Each of the rotatable brake disks 35 consist of a metal plate 60 having brake lining facings 58 and 59 on opposite sides of the plate 60, the linings 58 and 59 being adapted to engage adjacent stationary brake plates 40. The faces of the brake linings 58 and 59 are provided with a plurality of shallow passages whereby liquid under pressure can be circulated between the chambers 56 and 57 even though the brake disks 40 and 35 are in frictional engagement. The fluid circulating through the passages is for the purpose of removing the heat of friction from the brake disks.

To provide for circulation of fluid between the brake disks 40, 35, a fluid pump 65 is located within the recess chamber 66 in the brake housing 15. The pump 65 consists of a plurality of vanes 67 that are keyed to the shaft 10, the vanes being held out into engagement with the chamber wall 66 of the pump by means of rings 68. The pump 65 is thus a conventional vane type liquid pump adapted to receive fluid through the inlet line 70 and exhaust fluid under pressure through a series of ports 71 provided in the pump wall 72 that is held in position by means of the snap ring 73. Thus all fluid received into the vane pump 65 through the inlet line 70 is discharged under pressure into the internal chamber 56 for circulation between the brake disks 40, 35 when they are in a disengaged position or through the passages in the faces of the brake linings 58 and 59 when in engagement. Liquid passing through the brake disk assemblage 35, 40 enters the external chamber 57 and is exhausted through the discharge line 75 to a suitable heat exchange system in which the liquid is cooled and then returned into the inlet line 70 of the pump 65.

The annular piston 47 is exposed to the pressure fluid within the chambers 56 and 57, and particularly to the high pressure fluid in the chamber 56 that is delivered into this chamber from the pump 65. Thus, unless a seal is placed between the peripheral walls of the annular piston 47 and the annular cylinder chamber 49, there is a tendency for seepage of pressure fluid from the fluid chambers 56 and 57 into the chamber 49. Seepage of fluid into the chamber 49 would ultimately overfill the chamber and thereby tend to hold the brake disks 35 and 40 in engagement. If a seal member is placed between the walls of the annular cylinder 47 and the annular chamber 49 to seal against seepage of fluid, there is a considerable degree of friction created by the seal member which tends to resist movement of the piston 47.

In this invention therefore the annular piston 47 is provided with an annular groove 80 in the outer peripheral wall 81 and a corresponding annular groove 82 in the inner peripheral wall 83, the grooves 80 and 82 being between the walls of the piston 47 and the annular chamber 49. The annular grooves 80 and 82 are interconnected by means of a cross drilled passage 85. The grooves 80 and 82 intercept fluid seepage between the walls of the annular piston 47 and the chamber 49. The fluid seepage that is intercepted by the grooves 80 and 82 is conducted to a passage 86 that connects with a chamber 87 in the housing 15. The grooves 80 and 82 together with the passage 86 form a bleed-off passage means to prevent the seepage of fluid into the chamber 49.

With the pump 65 discharging fluid under pressure into the chamber 56, there will be a slight leakage of pressure fluid past the annular seal 90 on the hub 30 into the internal area 91 of the pump and thus into the seal chamber 92. The seal chamber 92 containing the seal 29 is connected with the chamber 87 by means of a passage 93 so that the pressure in the chamber 92 will also stand in the passage 86 and thus in the bleed-off passages 82 and 80 in the annular piston 47.

A ball check valve 95 closes a passage 96 in the plug 97 and is retained on its seat by a spring 98. The check valve chamber 99 is connected by means of a passage 100 with the suction or inlet side of the pump 65.

The spring 98 retains the check ball 95 on its seat to close the passage 96 until pressure in the chamber 87 is sufficient to raise the check ball and allow fluid that has collected in the chamber 87 to pass to the inlet side of the pump. The check ball 95 thereby creates a pressure differential in the bleed-off passage 86, 100 to prevent an extremely low pressure effected on the inlet side of the pump being connected with the bleed-off passages 80, 82 in the piston 47 by which fluid under pressure would be drawn along the engaging peripheral walls of the piston 47 and the chamber 49. Since a positive pressure, of low value, will be maintained in the passage 86, which pressure is considerably less than the pressure in the housing chamber 56, the fluid seepage into the bleed-off passages 80, 82 and 86 will always tend to return to the inlet side of the pump, or the low pressure side of the system.

It will be appreciated that in the event the pump is not used in the brake, but fluid under pressure is delivered into the chamber 56 and exhausted from the chamber 57, merely by connecting the same in a fluid circulating system, the bleed-off passage 86 will then be connected with the low pressure side of the system, that is the exhaust side so that the seepage bleed-off passages will always be connected with the low pressure side of the circulating system for the pressure fluid.

While the form of embodiment of the inevntion as herein disclosed constitutes a preferred form, it is to be understood that other forms might be adopted as may come within the scope of the claims which follow.

What is claimed is as follows.

1. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, means providing a hydraulic fluid circulating system including a high pressure hydraulic fluid chamber and a low hydraulic pressure fluid chamber on opposite sides of said assemblage to provide for hydraulic fluid circulation through the assemblage, a hydraulically operated piston means exposed to the pressure fluid in said chambers connected to said assemblage to actuate the same and reciprocable in cylinder means containing a hydraulic fluid to actuate said piston means, means forming annular grooves on a hydraulic fluid bleed-off passage in said piston, said grooves formed on the walls of said piston means adjacent said cylinder means to intercept seepage flow of hydraulic fluid between said walls, and means forming a hydraulic fluid flow return passage from said bleed off passage to the low pressure chamber of said hydraulic fluid system.

2. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, means providing a hydraulic fluid circulating system including a high pressure hydraulic fluid chamber and a low hydraulic fluid chamber on opposite sides of said assemblage to provide for hydraulic fluid circulation through the assemblage, a hydraulically operated piston means exposed to the hydraulic pressure fluid in said chambers connected to said assemblage to actuate the same and reciprocable in cylinder means containing hydraulic fluid to actuate said piston means, means forming a hydraulic fluid bleed-off passage between engaging walls of said piston means and said cylinder means to intercept seepage flow of hydraulic fluid between said walls, means forming a hydraulic fluid flow return passage from said bleed-off passage to the low pressure chamber of said system, and check valve means in said return passage providing for differential of pressure between opposite ends of the passage.

3. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, means providing a hydraulic fluid circulating system including a high pressure hydraulic fluid chamber and a low pressure hydraulic fluid chamber on opposite sides of said assemblage to provide for hydraulic fluid circulation through the assemblage, a hydraulically operated piston means exposed to the hydraulic pressure buid in said chambers connected to said assemblage to actuate the same and reciprocable in cylinder means containing hydraulic fluid to actuate said piston means, means forming a hydraulic fluid bleed-off passage in said piston means between engaging walls of said piston means and said cylinder means to intercept seepage flow of hydraulic fluid between said walls, means forming a hydraulic fluid flow return passage from said bleed-off passage to the low pressure chamber of said system, and check valve means in said return passage providing for differential of pressure between opposite ends of the passage with the high pressure side thereof connected with said bleed-off passage.

4. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, means providing a hydraulic fluid circulating system including a hydraulic fluid pump having a high pressure fluid chamber and a low pressure fluid chamber connected with opposite sides of said assemblage to provide for hydraulic fluid circulation through the assemblage, a hydraulically operated piston means exposed to the pressure fluid on opposite sides of said assemblage connected to said assemblage to actuate the same and reciprocable in cylinder means containing hydraulic fluid to actuate said piston means, means forming a fluid bleed-off passage in said piston means between engaging walls of said piston means and said cylinder means to intercept seepage flow of hydraulic fluid between said walls, means forming a hydraulic fluid flow return passage from said bleed-off passage to the low pressure chamber of said pump, and check valve means in said return passage providing differential of pressure in the passage between the said bleed-off passage and the low pressure chamber of said pump.

5. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, means providing a hydraulic fluid circulating system including a high pressure fluid chamber and a low pressure fluid chamber on opposite sides of said assemblage to provide for hydraulic fluid circulation through the assemblage, a hydraulically operated annular piston means exposed to the pressure fluid in said chambers connected to said assemblage to actuate the same and reciprocable in annular cylinder means containing hydraulic fluid to actuate said piston means, said assemblage and said annular piston means providing for separation between the high pressure fluid chamber and the low pressure fluid chamber, annular grooves forming fluid bleed-off passage means between each of the peripherally engaging walls of said piston means and said cylinder means adapted to intercept seepage flow of hydraulic fluid between said walls from either the high pressure or low pressure chamber, and means forming a hydraulic fluid flow return passage from said bleed-off passage to the low pressure side of said system, and a valve biased to maintain a residual pressure in said bleed-off passage relative to said return passage.

6. In a friction brake, the combination of, a stationary housing, a rotatable shaft in said housing, a plurality of cooperatively engaging brake plates forming a plate assemblage in said housing some of which plates are connected with said shaft for rotation therewith and others of which are connected with said housing as stationary plates, said assemblage dividing said housing into two hydraulic fluid receiving chambers one of which is internal of said assemblage and the other external thereof, a hydraulic fluid pump within said housing and connected with one of said chambers for discharge of pressure thereinto, the other of said chambers having means providing for exhausting of hydraulic fluid from the said chamber, a hydraulically operated annular piston means engaging said assemblage to actuate the same and reciprocable in annular cylinder means containing hydraulic fluid to actuate said piston means, said piston means projecting from said cylinder means and extending into said chambers and engaging said assemblage for actuation thereof and exposed to the pressure fluid in said chambers, groove means forming hydraulic fluid bleed-off passage means between engaging peripheral walls of said piston means and said cylinder means adapted to intercept seepage flow of hydraulic fluid between said walls and means forming hydraulic fluid flow return passage means from said bleed-off passage to the low pressure side of said pump, a spring biased valve means in said return passage to maintain a predetermined pressure in said bleed-off passage relative to said low pressure side of said pump.

References Cited in the file of this patent

UNITED STATES PATENTS

| | | |
|---|---|---|
| 1,828,874 | Myers | Oct. 27, 1931 |
| 2,369,249 | Rainalter | Feb. 13, 1945 |
| 2,471,858 | Bloomfield | May 31, 1949 |
| 2,526,236 | Ingres | Oct. 17, 1950 |
| 2,788,870 | Heck | Apr. 16, 1957 |

FOREIGN PATENTS

| | | |
|---|---|---|
| 1,095,884 | France | Dec. 29, 1954 |
| 739,244 | Great Britain | Oct. 26, 1955 |